United States Patent [19]

Lehner et al.

[11] Patent Number: 4,673,591

[45] Date of Patent: Jun. 16, 1987

[54] PRODUCTION OF LAYER-TYPE MAGNETIC RECORDING MEDIA

[75] Inventors: August Lehner, Roedersheim-Gronau; Guenter Heil, Ludwigshafen; Werner Lenz, Bad Durkheim; Werner Balz, Limburgerhof; Albert Kohl, Laumersheim; Gunnar Schornick, Neuleiningen, all of Fed. Rep. of Germany

[73] Assignee: BASF Aktiengesellschaft, Ludwigshafen, Fed. Rep. of Germany

[21] Appl. No.: 759,237

[22] Filed: Jul. 26, 1985

[30] Foreign Application Priority Data

Jul. 27, 1984 [DE] Fed. Rep. of Germany .... 3427681.5

[51] Int. Cl.$^4$ ............................................. H01F 10/02
[52] U.S. Cl. ........................................ 427/48; 427/36; 427/44; 427/54.1; 427/128; 427/130; 428/694; 428/900
[58] Field of Search ............................... 427/127–132, 427/48; 428/900, 694

[56] References Cited

U.S. PATENT DOCUMENTS 3,104,983  9/1963  Tarwater ........................ 117/93.31

FOREIGN PATENT DOCUMENTS 1497658 12/1978 United Kingdom .
1497657 12/1978 United Kingdom .
1497656 12/1978 United Kingdom .

OTHER PUBLICATIONS

PCT Appln. PCT/US 81/01276 Filed Sep. 22, 1981, UV Curing; Science & Technology, Editor: S. Peter Pappas.
Technology Marketing Corporation, Stanford, USA 1978, Technology Atomic Radiation & Polymers, Charlesby, Pergamon Press 1960.

Primary Examiner—Bernard D. Pianalto
Attorney, Agent, or Firm—Keil & Weinkauf

[57] ABSTRACT

Layer-type magnetic recording media are produced by dispersing a finely divided magnetically anisotropic material in a binder which consists of not less than 30% of a radiation-curable aqueous binder dispersion, applying the dispersion onto a non-magnetic base, orienting the magnetically anisotropic material and drying and crosslinking the applied layer by means of UV or high-energy electron radiation.

10 Claims, No Drawings

PRODUCTION OF LAYER-TYPE MAGNETIC RECORDING MEDIA

The present invention relates to a process for the process for the production of layer-type magnetic recording media, comprising a non-magnetic base and, applied onto this, one or more magnetizable layers consisting of anisotropic magnetic material finely dispersed in an organic binder, with the use of a radiation-curable aqueous binder dispersion.

Because of developments in the field of magnetic sound, image and data storage, the magnetic recording media have to meet constantly increasing requirements, while at the same time the desire to use this technology widely has meant that the reliability of these media has to be constantly increased. For example, higher recording densities frequently require the production of thinner magnetic layers in all of the stated application forms. For this reason, the packing density of the magnetic material in the magnetic layer, the residual induction in the recording direction, the uniform distribution of the magnetic material in the layer and the surface smoothness and homogeneity of the layer have to be improved. All these requirements, which the magnetic layer has to meet while exhibiting increased recording density, being free from errors and having a constant output level, can be influenced to a considerable extent by the type of binder used. It is important that the binder thoroughly wets the magnetic material so that homogeneous dispersing in the layer is achieved, possesses good flow and film-forming properties, resulting in a satisfactory surface of the magnetic layer, and imparts to the magnetic layer the mechanical stability appropriate for the load.

In order to produce magnetic recording media of this type, the conventional layers containing the magnetic material were predominantly produced with the aid of highly polymeric, solvent-containing, physically drying or chemically crosslinkable binders or binder mixtures. The solvents used were, for example, methyl ethyl ketone, methyl isobutyl ketone, ethyl acetate, butyl acetate, methanol, ethanol, propanol, butanol, toluene, xylene, tetrahydrofuran and dioxane. The pollutant properties, in particular flammability and toxicity, of these solvents and the relatively high price are disadvantages. For these reasons, it has long been regarded as necessary to work in closed systems and to circulate the solvent via a recovery unit, which has to be installed additionally.

Since the physically drying binders no longer adequately meet the demands made on high quality recording media, it has also been proposed to crosslink high molecular weight thermoplastic binders with, for example, polyisocyanates. The disadvantages of such a procedure are that the crosslinking reactions are very sensitive to temperature effects and moisture contents, and this type of crosslinking requires exact metering of the components. Furthermore, in this procedure the crosslinking agent, with all its undesirable side effects, remains in the magnetic layer; an attempt has therefore also been made to use radiation-curable binders, e.g. butadiene/acrylonitrile (U.S. Pat. No. 3,104,983) and mixtures of high molecular weight thermoplastic polymers and polyfunctional acrylate prepolymers (WO No. 82/01099). The use of organic solvents is also a disadvantage here.

On the other hand, the use of aqueous polymer dispersions in the preparation of the dispersions of magnetic materials which are suitable for the manufacture of magnetic recording media has been proposed. For example, German Laid-Open Applications DOS Nos. 2,513,421 and DOS 2,513,422 describe aqueous polymer dispersions based on crosslinkable vinyl acetate or acrylate polymers and melamine/formaldehyde. However, the assistants, such as protective colloids, thickeners or emulsifiers, which are required for the preparation of these dispersions result in foam formation during the preparation of the dispersions of the magnetic materials and give magnetic layers exhibiting a greater tendency to smearing. East German Pat. No. 116,963, too, describes the production of magnetic layers using aqueous dispersions. However, the binders used give layers which are sensitive to moisture, tend to stick and to smear and have surfaces which are not very abrasion-resistant. The use of crosslinked cationic polyurethanes for coating leather and textiles and also for the production of magnetic layers is proposed in East German Pat. No. 116,248. However, the disadvantage here is that even small differences in pH between the magnetic material and the binder cause the stated polyurethane to undergo partial crosslinking or partial coagulation, with the result that the processability of the magnetic dispersion and the quality of the recording medium are adversely affected.

It is an object of the present invention to utilize the known advantages of aqueous polymer dispersions to produce layer-type magnetic recording media with the aid of radiation-curable aqueous binders, in which the disadvantages described do not occur, i.e. the recording media are not sensitive to moisture, do not tend to stick, exhibit little abrasion of the layer and possess an extremely smooth surface coupled with advantageous behavior with regard to errors.

We have found that this object is achieved, and that layer-type magnetic recording media can be produced, by dispersing a finely divided magnetically anisotropic material in a binder which consists of not less than 30% of a radiation-curable aqueous binder dispersion, applying the dispersion onto a non-magnetic base, orienting the magnetically anisotropic material and drying and crosslinking the applied layer, if the radiation-curable aqueous binder dispersion essentially consists of (A) from 20 to 80% by weight of water, (B) from 80 to 20% by weight of one or more prepolymers which are dispersed in (A), contain from 0.01 to 1.0 mole of polymerizable C—C double bonds per 100 g of prepolymer and have a mean molecular weight of not less than 350 and a viscosity of not less than 600 cP at 23° C., with the proviso that the sum of the percentages stated under (A) and (B) is 100, and in addition (C) from 0.1 to 30% by weight, based on (B), of one or more dispersants, the crosslinked unpigmented polymer film having an elongation greater than 10%, a tensile strength greater than 10 N/mm$^2$ and a modulus of elasticity greater than 100 N/mm$^2$.

Preferred components (B) are polymerizable polyesters which contain C—C double bonds and have an acid number no higher than 10, polymerizable polyethers containing C—C double bonds, hydroxyl-containing reaction products of a polyepoxide containing two or more epoxide groups per molecule with one or more α- and/or β-ethylenically unsaturated carboxylic acids, polyurethane (meth)acrylates and acryl copolymers containing α- and/or β-ethylenically unsaturated acyl radicals.

The preparation of these radiation-curable aqueous binder dispersions is known per se (German Laid-Open Application DOS No. 2,853,921). A solution of component (B) in an inert organic solvent or solvent mixture is mixed with an aqueous solution of component (C), and the inert organic solvent or solvent mixture is removed by distillation. In this procedure, any additional conventional assistants and additives can be added to the solution of the component (B) or introduced after the inert organic solvent or solvent mixture has been distilled off. These radiation-curable aqueous binder dispersions are virtually free of volatile components, such as monomers or cosolvents, which pollute the environment.

Suitable starting materials for producing the radiation-curable aqueous binder dispersions are the following:

(A) Component (A) is water, which is present in an amount of from 20 to 80, preferably from 30 to 60%, by weight.

(B) Component (B) is a film-forming prepolymer or prepolymer mixture which is dispersed in water, or dissolved therein in special cases, contains from 0.01 to 1.0, preferably from 0.04 to 0.6, mole of polymerizable double bonds per 100 g of substance and has a mean molecular weight of not less than 350, preferably not less than 600, and a viscosity (according to DIN draft 53,788) of not less than 600, preferably 1000, cP at 23° C. This prepolymer can be, for example, (1) a polyester which has an acid number of not more than 10 and is obtained from aliphatic and/or aromatic dicarboxylic acids, such as succinic acid, glutaric acid, adipic acid, pimelic acid, suberic acid, azelaic acid, sebacic acid, cyclohexane dicarboxylic acid, phthalic acid, isophthalic acid, terephthalic acid, maleic acid, fumaric acid or itaconic acid or their derivatives, and polyhydric alcohols, such as ethylene glycol, polyethylene glycols, propylene glycol, polypropylene glycols, butanediol, hexanediol, neopentylglycol, neopentylglycol hydroxypivalate, trimethylolpropane, glycerol, pentaerythritol and/or trishydroxyethyl isocyanurate, and α- and/or β-ethylenically unsaturated monocarboxylic acids, for example acrylic acid, methacrylic acid, crotonic acid or cinnamic acid, and/or dicarboxylic half esters of monoalkanols, such as maleic, fumaric and itaconic half esters of $C_1$–$C_4$-monoalcohols, acrylic acid and methacrylic acid being preferred, and which can be prepared by a conventional process in one stage or stepwise, (2) an aliphatic or araliphatic polyether which is obtained by reacting dihydric and/or polyhydric alcohols, which are also stated under (1), with various amounts of ethylene oxide and/or propylene oxide, and some or all of whose free hydroxyl groups are etherified with ethylenically unsaturated alcohols, e.g. allyl alcohol, methallyl alcohol, crotylalcohol or cinnamyl alcohol, and/or esterified with α- and/or β-ethylenically unsaturated monocarboxylic acids as stated under (1), (3) an unsaturated hydroxyl-containing compound which can be prepared by reacting a polyepoxide having on average two or more epoxide groups per molecule, for example polyglycidyl ethers of polyhydric alcohols, as stated under (1), polyglycidyl ethers of polyhydric phenols, such as bisphenol A, glycidyl esters of polybasic carboxylic acids, as likewise stated under (1), other glycidyl compounds, e.g. triglycidyl isocyanurate, and/or epoxidized natural or synthetic oils with α- and/or β-ethylenically unsaturated carboxylic acids, as likewise stated under (1), (4) a polyurethane which may or may not contain urea groups and can be prepared from aliphatic and/or aromatic polyisocyanates, e.g. tetramethylene diisocyanate, hexamethylene diisocyanate, isophorone diisocyanate, diphenyl methane diisocyanate, toluylene diisdcyanate, naphthylene diisocyanate or 4,4'-diphenyl ether diisocyanate, dimers or trimers which may be obtained from these, and their reaction products with minor amounts of compounds possessing active hydrogen atoms, for example polyhydric alcohols, which are also stated under (1), polyfunctional amines and/or amino alcohols, by reaction with hydroxyl-containing (meth)acrylates, such as hydroxyethyl (meth)acrylate, hydroxypropyl (meth)acrylate and/or butanediol mono(meth)acrylate, (5) a polymer which can be obtained by introducing α- and/or β-ethylenically unsaturated acyl radicals, which are derived from, for example, the α- and/or β-ethylenically unsaturated monocarboxylic acids stated under (1), into acrylate copolymers, styrene/acrylate copolymers or the like, prepared by conventional solution polymerization, having a content of not less than 0.02 mole of hydroxyl, carboxyl and/or epoxide groups per 100 g of substance.

Mixtures of the prepolymers stated under (1) to (5) are also suitable. Component (B) is present in the stated aqueous binder dispersions in amounts of from 80 to 20, preferably from 70 to 40%, by weight.

(C) Component (C) is a conventional dispersant and is present in the radiation-curable aqueous binder dispersions in amounts of from 0.1 to 30, preferably from 3 to 12%, by weight, based on (B). They are preferably water-soluble high molecular weight organic compounds possessing polar groups, e.g. polyvinylpyrrolidone, copolymers of vinyl propionate or acetate and vinylpyrrolidone, partially hydrolyzed copolymers of acrylates and acrylonitrile, polyvinyl alcohols having various residual acetate contents, cellulose ethers, gelatine or mixtures of these substances. Particularly preferred protective colloids are polyvinyl alcohol having a residual acetate content of less than 35, in particular from 5 to 30, mol % and/or a vinylpyrrolidone/vinyl propionate copolymer having a vinyl ester content of less than 35, in particular from 5 to 30%, by weight.

Moreover, nonionic emulsifiers can be used, and in special cases it is also possible to employ ionic ones. Preferred emulsifiers are fairly long-chain alcohols or phenols exhibiting various degrees of oxyethylation and/or oxypropylation (adducts of from 4 to 50 moles of ethylene oxide and/or propylene oxide). Combinations of the above protective colloids with such emulsifiers are particularly advantageous since they give more finely divided dispersions.

In developing the novel process, it was also found to be advantageous if the radiation-curable aqueous binder dispersions are combined with aqueous binder dispersions which are not radiation-curable. In general, mixtures of from 40 to 95% of radiation-curable dispersions and from 5 to 60% of dispersions which are not radiation-curable are suitable for this purpose.

The magnetic recording media are produced in a conventional manner.

Magnetic pigments which can be used are the conventional ones, these pigments of course playing a role in determining the properties of the resulting magnetic layers. Examples of suitable magnetic pigments are gamma-iron(III) oxide, finely divided magnetite, undoped or doped ferromagnetic chromium dioxide, cobalt-doped gamma-iron-(III) oxide and ferromagnetic metals and metal alloy pigments, such as alloys of iron and cobalt (prepared, for example, as described in German Pat. No. 1,247,026). Preferred magnetic pigments are acicular gamma-iron(III) oxide and ferromagnetic chromium dioxide. The particle size is in general from 0.2 to 2 μm, preferably from 0.3 to 0.8 μm.

In a conventional manner, the magnetic layers may furthermore contain small amounts of additives such as dispersants and/or lubricants, as well as fillers, which are mixed in during dispersing of the magnetic pigments or during the production of the magnetic layer. Examples of such additives are fatty acids or isomerized fatty acids, such as stearic acid or its salts with metals of main groups 1 to 4 of the Periodic Table of Elements, amphoteric electrolytes, such as lecithin, and fatty acid esters or waxes, silicone oils, carbon black, etc. A particularly advantageous dispersant is prepared from 25–85% of a polyether acrylate having from 2 to 10 ether groups per double bond and 15–75% of acrylic acid or methacrylic acid. The additives are used in a conventional amount, in general in an amount of less than 10% by weight, based on the magnetic layer.

The ratio of magnetic pigment to binder in the novel recording materials is in general from 1 to 10, in particular from 3 to 6, parts by weight of magnetic pigment to 1 part by weight of the binder or binder mixture. A particular advantage resulting from the excellent pigment-binding capacity of the aqueous binder dispersions is that high magnetic pigment concentrations in the magnetic layers are possible without the mechanical properties being adversely affected or the performance characteristics suffering noticeably.

Suitable non-magnetic and non-magnetizable bases are the conventional rigid or flexible bases, in particular films of linear polyesters, such as polyethylene terephthalate, in general from 4 to 200 μm, in particular from 6 to 36 μm, thick. Recently, the use of magnetic layers on paper bases for electronic computing and accounting machines has also become important; the novel coating materials can also advantageously be used for this purpose.

To produce the magnetic recording media, a magnetic dispersion is prepared in a dispersing machine, e.g. a steel ball mill or a stirred ball mill, from the magnetic pigment and the aqueous binder dispersion, with the addition of dispersants and other additives, and the dispersion is filtered and then applied onto the base by means of a conventional coating machine, for example a knife coater. As a rule, magnetic orientation is effected before the liquid coating mixture is dried on the base, this procedure advantageously taking place for from 2 to 5 minutes at from 60° to 120° C. The magnetic layers are then calendered and compacted on conventional machines by being passed between heated and polished rollers, if necessary under pressure and at from 50° to 100° C., preferably from 60° to 80° C. The thickness of the magnetic layer is in general from 0.5 to 20 μm, preferably from 4 to 10 μm. Curing of the magnetic layers is then effected by exposing them for a short time to UV or high-energy electron radiation. This is done using the UV or electron radiation sources usually employed for curing coatings, as described in, for example, UV Curing: Science and Technology, editor S. Peter Pappas, Technology Marketing Corporation, Stanford, USA, 1978, and Atomic Radiation and Polymers, Charlesby, Pergamon Press, 1960.

Compared with magnetic recording media produced using prior art binders, these magnetic recording media prepared according to the invention possess improved homogeneity of the magnetic layer. Because the latter is both uniform and homogeneous, the novel magnetic recording media produce substantially fewer errors. The improved abrasion resistance and reduced moisture sensitivity of the magnetic recording media produced according to the invention are also noteworthy. These advantages can furthermore be obtained using a binder system which avoids the known disadvantages and risks involved in the use of organic solvents. Further advantages of the novel process are the high thermoplasticity which the special binders employed exhibit prior to curing, with the result that good films, i.e. an excellent surface of the layer, can be produced, the mechanical strength of which can be substantially improved by the final curing procedure.

The Example which follows illustrates the process according to the invention:

EXAMPLE

A. Preparation of the prepolymer 0.4 equivalent of a polyester (obtained from adipic acid and butane-1,4-diol and having an OH number of 110), 0.5 equivalent of butane-1,4-diol and 0.1 equivalent of trimethylolpropane in 250 parts of methyl ethyl ketone were initially taken and reacted with 1.25 equivalents of toluylene diisocyanate (isomer mixture of 2,4- and 2,6-toluylene diisocyanate) at 55° C. After 1 hour, 0.25 equivalent of butanediol monoacrylate was added, and the reaction was continued until the NCO value was >0.1%.

B. Preparation of the binder dispersion 500 parts of the 60% strength solution of the prepolymer were added to 200 parts of a 15% strength aqueous solution of a copolymer of 66 parts of N-vinylpyrrolidone and 34 parts of vinyl propionate at room temperature in the course of 1 hour, while stirring vigorously. With stepwise addition of 270 parts of water, the methyl ethyl ketone was then removed azeotropically with water under from 90 to 100 mbar and at an initial internal temperature of from 40° to 45° C. The solids content of the dispersion was 46.7%.

C. Production of the magnetic tape 100 parts of a $\gamma$-$Fe_2O_3$ having a coercive force of 26.5 kA/m, 2 parts of a polymer of a polyether acrylate, possessing 5 ether groups per double bond, and acrylic acid, 2.5 parts of a commercial dispersant based on the salts of fatty acids, 80 parts of water and 60 parts of the binder dispersion according to B were converted to a dispersion in a ball mill in the course of 40 hours.

The resulting dispersion of magnetic material was filtered through a paper filter having a pore size of 5 μm, after which a 12 μm thick polyethylene terephthalate film was coated with the dispersion by means of a conventional knife coater. The coated film was passed through a homogeneous magnetic field in order to orient the gamma-iron(III) oxide particles and was then dried at from 60° to 120° C. Thereafter, the layer was calendered at 60° C. under a nip pressure of 23 N/mm². The thickness of the magnetic layer was 5.0±0.3 μm. The coated film was then cured in an electron beam unit (acceleration voltage 160 kV) with a curing dose of 70 Joule/g.

Slitting into a tape width of 3.81 mm was followed by determination of the following electroacustic properties against reference tape T 308 S, in accordance with DIN 45,401, 45,403, and 45,512 (sheet 82):

$E_T$: +0.2 dB
$E_H$: −1.0 dB
$A_T$: ±0 dB
$A_H$: −0.6 dB
$K_O$: +2.0 dB
$R_{GA}$: +2.1 dB

The mechanical properties were measured in the following tests:

TEST 1

Coefficient of friction (layer/steel, before/after continuous operation)

The coefficients of friction were determined in accordance with DIN 45,522, sheet 1, on the unused tape and on a tape which has been subjected to continuous use. The result was 0.23/0.26.

TEST 2

Quasistatic friction

The coefficient of friction was determined by measuring the tensile force which was produced as a result of friction generated by a magnetic tape passing over a fixed graduated drum. The latter was a steel drum having a surface roughness of about 0.15 µm and a diameter of 70 mm. The piece of tape was 25 cm long and was fed over the drum under a tape tension of 20 cN at a rate of 1 mm/sec and at an angle of wrap of 180°. The tension at the load cell, F, is a measure of the coefficient of friction $\mu$, the relation expression being $\mu = 1/\pi \cdot \ln F/20$. The result was $\mu = 0.14$.

TEST 3

Dynamic friction

The relevant coefficient of friction was measured using a procedure similar to that for Test 2, except that the graduated drum rotated at a speed of 9.5 cm/sec. The result was $\mu = 0.28$.

TEST 4

Abrasion during continuous operation

This measurement is used to assess the abrasion properties of a tape. The abrasion was measured in the form of a weight loss of a tape loop, in mg. The length of the loop was 95 cm, the tape speed 4 m/sec, the tape tension 35 cN and the running time 1 hour, the test being carried out at an ambient temperature of 23° C. and a relative humidity of 50%. The result was 0.1 mg.

We claim:

1. A process for the production of a layer-type magnetic recording medium by dispersing a finely divided magnetically anisotropic material in a binder which consists of not less than 30% of a radiation-curable aqueous binder dispersion, applying the dispersion onto a non-magnetic base, orienting the magnetically anisotropic material and drying and crosslinking the applied layer, wherein the radiation-curable aqueous binder dispersion essentially consists of
   (A) from 20 to 80% by weight of water,
   (B) from 80 to 20% by weight of one or more prepolymers which are dispersed in (A), contain from 0.01 to 1.0 mole of polymerizable C—C double bonds per 100 g of prepolymer and have a mean molecular weight of not less than 350 and a viscosity of not less than 600 cP at 23° C., with the proviso that the sum of the percentages stated under (A) and (B) is 100, and in addition
   (C) from 0.1 to 30% by weight, based on (B), of one or more dispersants, the crosslinked unpigmented polymer film having an elongation greater than 10%, a tensile strength greater than 10 N/mm² and a modulus of elasticity greater than 100 N/mm².

2. The process of claim 1, wherein component (B) is a polyester which contains polymerizable C—C double bonds and has an acid number of not more than 10.

3. The process of claim 1, wherein component (B) is a polyether which contains polymerizable C—C double bonds.

4. The process of claim 1, wherein component (B) is a hydroxyl-containing reaction product of a polyepoxide containing two or more epoxide groups per molecule with one or more α- and/or β-ethylenically unsaturated carboxylic acids.

5. The process of claim 1, wherein component (B) is a polyurethane (meth)acrylate.

6. The process of claim 1, wherein component (B) is a polymer which contains polymerizable double bonds and is obtained by introducing α- and/or β-ethylenically unsaturated acyl radicals into acrylate copolymers.

7. The process of claim 1, wherein component (B) is a thermoplastic polyurethane elastomer which possesses terminal (meth)acrylate double bonds or (meth)acrylate double bonds in side groups and has a molecular weight of from 1000 to 70,000.

8. The process of claim 1, wherein component (C) is a polyvinyl alcohol having a residual acetate content of less than 35 mol % and/or a vinylpyrrolidone/vinyl ester copolymer having a vinyl ester content of less than 35% by weight.

9. The process of claim 1, wherein component (B) consists of from 40 to 95% of a radiation-curable dispersion and from 5 to 60% of a dispersion which is not radiation-curable.

10. The process of claim 5, wherein the polyurethane (meth)acrylate contains urea groups.

* * * * *